United States Patent [19]

Broyde et al.

[11] 4,071,479
[45] Jan. 31, 1978

[54] RECLAMATION PROCESSING OF VINYL CHLORIDE POLYMER CONTAINING MATERIALS AND PRODUCTS PRODUCED THEREBY

[75] Inventors: Barret Broyde, Decatur; Judith Archer Delles, Duluth; Steven Forrest North, Chamblee, all of Ga.

[73] Assignee: Western Electric Company, Inc., New York, N.Y.

[21] Appl. No.: 670,469

[22] Filed: Mar. 25, 1976

[51] Int. Cl.² .................. C08J 11/00; C08J 11/02; C08J 11/04
[52] U.S. Cl. ........................................... 260/2.3
[58] Field of Search ........................................ 260/2.3

[56] References Cited
U.S. PATENT DOCUMENTS

| | | | |
|---|---|---|---|
| 2,914,492 | 11/1959 | Bennett et al. | 260/2.3 |
| 2,915,482 | 12/1959 | Nagle et al. | 260/2.3 |
| 3,043,785 | 7/1962 | Wright et al. | 260/2.3 |
| 3,232,891 | 2/1966 | Bata | 260/2.3 |
| 3,256,212 | 6/1966 | Grover et al. | 260/2.3 |
| 3,624,009 | 11/1971 | Sussman et al. | 260/2.3 |
| 3,666,691 | 5/1972 | Spiller | 260/2.3 |
| 3,836,486 | 9/1974 | Hafner | 260/2.3 |
| 3,912,664 | 10/1975 | Wainer | 260/2.3 |

*Primary Examiner*—Thomas DeBenedictis, Sr.

*Attorney, Agent, or Firm*—E. W. Somers

[57] ABSTRACT

Recompoundable polyvinyl chloride suitable to be recompounded for reuse, for example, in cable and wire production is recovered from a scrap material which includes plasticized polyvinyl chloride. A charge of plasticized polyvinyl chloride scrap material is treated with a solvent such as methyl ethyl ketone, tetrahydrofuran, cyclohexanone or dimethyl formamide to form a solvent mixture with one component thereof being a solvent solution of dissolved vinyl chloride polymer and plasticizers. The mixture is heated and agitated and scrap metal and other gross solids, if present, are removed. Then the solvent mixture is treated with an acid which advantageously causes a flocculation of suspended insolubles such as pigments and fillers. Except when using cyclohexanone as the solvent, the treatment with the acid must be accomplished, unexpectedly, in the presence of an additional flocculating agent such as a cellulose acetate which is soluble in the solution and which is insolubilized by the acid on refluxing. Recompoundable polyvinyl chloride is precipitated out by a non-solvent for the polyvinyl chloride which is miscible with the solvent in substantially all proportions, which will dissolve the plasticizer. The solvent and the non-solvent are removed from the plasticizer and are recovered separately by fractional distillation, for example.

26 Claims, 3 Drawing Figures

RECLAMATION PROCESSING OF VINYL CHLORIDE POLYMER CONTAINING MATERIALS AND PRODUCTS PRODUCED THEREBY

BACKGROUND OF THE INVENTION

1. Field of the Invention

This invention relates to the reclamation processing of vinyl chloride polymer-containing materials and, more particularly, to methods of and apparatus for separating and recovering a recompoundable vinyl chloride polymer, particularly polyvinyl chloride (hereinafter PVC), from a polymeric scrap material, and to a recompoundable PVC resulting therefrom.

2. Description of the Prior Art

Scrap material including metal components generated during many industrial processes has for years been reprocessed to recover the metal therefrom. Copper, for example, has been recovered from telephone cables which have been scrapped at some stage of the manufacturing process. Telephone cables which have been removed from service have likewise been reprocessed. The residue from prior art metal reclaiming processes has included middlings of textile, plasticizers, pigments and fillers as well as a basic insulating plastic compound such as PVC. Only limited use has been found for this residue, as such, and to date the residue has not been convertible economically into its individual components.

In the past, the residue has been disposed of by incineration or has been used as land fill, however, ecological considerations now require more desirable disposal procedures. Moreover, economic factors similar to the high cost and uncertain supply of copper which have historically justified copper reclaiming, have come to apply to polymers and plasticizers under present international market conditions.

Recent industry efforts have been made, for example, to reclaim PVC for re-use. In general, it is well known that solvent recovery techniques can be employed for dissolving both PVC and associated plasticizers, which together are the major weight fraction of the nonmetallic components of scrap telephone cable. In this approach, the metal is readily separated, and the nonmetallic components can thereafter be recovered.

The published prior art (See, for example U.S. Pat. No. 3,836,486.) includes the treating of a scrap charge, which includes a plasticized PVC composition with a solvent, such as, for example, tetrahydrofuran, cyclohexanone or methylethyl ketone, to form a solvent mixture. The solvent mixture is then treated with a nonsolvent for PVC to precipitate out and to separate a PVC composition from plasticizers, solvent and nonsolvent which are recovered subsequently for reuse.

The products recovered from the above-described process will vary in composition depending on the quantity of other soluble or suspendable particulate matter, such as plasticizers, flame retardants, fillers, and pigments, which were present in the original scrap charge. Where scrap material from a variety of sources is used, variations in the components of the scrap material are not readily controllable at the process input.

The PVC composition recovered by the abovementioned process undesirably includes components, such as pigments and fillers, which would cause the recovered PVC to be unsuitable for use in insulating wires and cables where color coding is a consideration. In order to recover a PVC which is readily reusable in the wire and cable industry, a recovery process must include the capability of separating pigments and fillers, and other additives as well as the plasticizers, from the scrap material so that an essentially pure PVC resin is obtained.

In U.S. Pat. No. 3,043,785 a pigmented polymeric composition is advantageously depigmented by a process which includes dissolving the pigmented polymeric composition in a suitable nonreactive water insoluble organic solvent. A water-soluble cellulose ether is incorporated in an aqueous phase which is then mixed with the resulting organic solution containing a dispersed pigment to accelerate pigment settling. Then the organic polymer solution is separated from the pigment and the aqueous phase by settling the organic polymer solution from the aqueous phase, by separating the organic polymeric solution from the aqueous phase, by filtering the separated polymeric solution, and by subsequently isolating and recovering the reclaimed and depigmented polymer. See also U.S. Pat. No. 2,915,482.

The prior art also shows a polyethylene carbon black mixture dissolved in an organic solvent and the addition of a strongly acidic coagulant such as hydrochloric acid after which the mixture is refluxed. See U.S. Pat. No. 3,232,891.

SUMMARY OF THE INVENTION

In accordance with the principles of this invention, a process for recovering an essentially pure vinyl chloride polymer from a scrap material which comprises plasticized PVC and additives insoluble in particular solvents, includes the steps of contacting the scrap material with a solvent for vinyl chloride polymers to form a solvent mixture comprising a solvent solution of dissolved polyvinyl chloride and plasticizers and suspended particulates, treating the mixture with at least an acid which is selected from the group consisting of an acid and an inorganic solution and which is substantially soluble in the solvent to flocculate and remove the suspended particulates, and treating the solvent solution with a non-solvent which is miscible with the solvent in substantially all proportions and which is a solvent for the plasticizer to selectively precipitate essentially pure vinyl chloride polymer therefrom.

More particularly, scrap material which includes, for example, plasticized PVC is dried and then contacted with a well known solvent for vinyl chloride polymers and plasticizers such as, for example, methyl ethyl ketone to form a solvent mixture comprising a solvent solution of dissolved vinyl chloride polymers and suspended particulates. The solvent mixture with copper and other gross solid components thereof is then passed through a separator where the copper and other gross solids are removed.

The solvent mixture is then passed through a flocculation tank wherein an acid, such as hydrochloric acid, is added in order to flocculate and to precipitate the suspended particulates such as pigments and fillers. Following the addition of the acid, calcium hydroxide is introduced to accelerate the flocculation and to neutralize the acid. Except when using cyclohexanone as the solvent, the treatment with the acid must be accomplished in the presence of a suitable supplementary flocculating agent. A suitable supplementary flocculating agent has been found to be a polymeric material such as cellulose acetate, for example, which is soluble in the solvent solution and which is selectively insolubilized by an acid on refluxing. Except when processing scrap conductors and cable which may include cellulose acetate coatings, for example, the supplementary flocculating agent must be added to the solvent mixture prior to the addition of the acid.

When the scrap material is comprised essentially of a vinyl chloride polymer composition, it has been found that a suitable flocculating agent is a polymeric flocculating agent which is soluble in the solvent solution and is insolubilized by acid on refluxing.

Then the solvent solution containing the plasticized PVC is treated with a nonsolvent for the PVC, for example, methanol, to precipitate out of the solution an essentially pure PVC resin. The solvent and the nonsolvent are selected to be miscible with each other. The resulting mixture of a solution of plasticizer, solvent and nonsolvent and the PVC precipitate is centrifuged with the PVC being separated and dried. The PVC is then suitable for recompounding and reuse in wire and cable production. The solution comprising the solvent and nonsolvent together with the plasticizer is moved through a water dryer and then to a solvent sill where the solvent and nonsolvent are removed separately from the solution which is then further distilled to recover plasticizers which also may be reused in subsequent processing.

BRIEF DESCRIPTION OF THE DRAWINGS

Other objects and features of the present invention will be more readily understood from the following detailed description of specific embodiments thereon when read in conjunction with the accompanying drawings, in which:

FIG. 3 is a graph showing the molecular weight distribution of commercially available virgin PVC and of the PVC resin recovered by a process which embodies the principles of this invention.

Detailed Description

Figure 1:
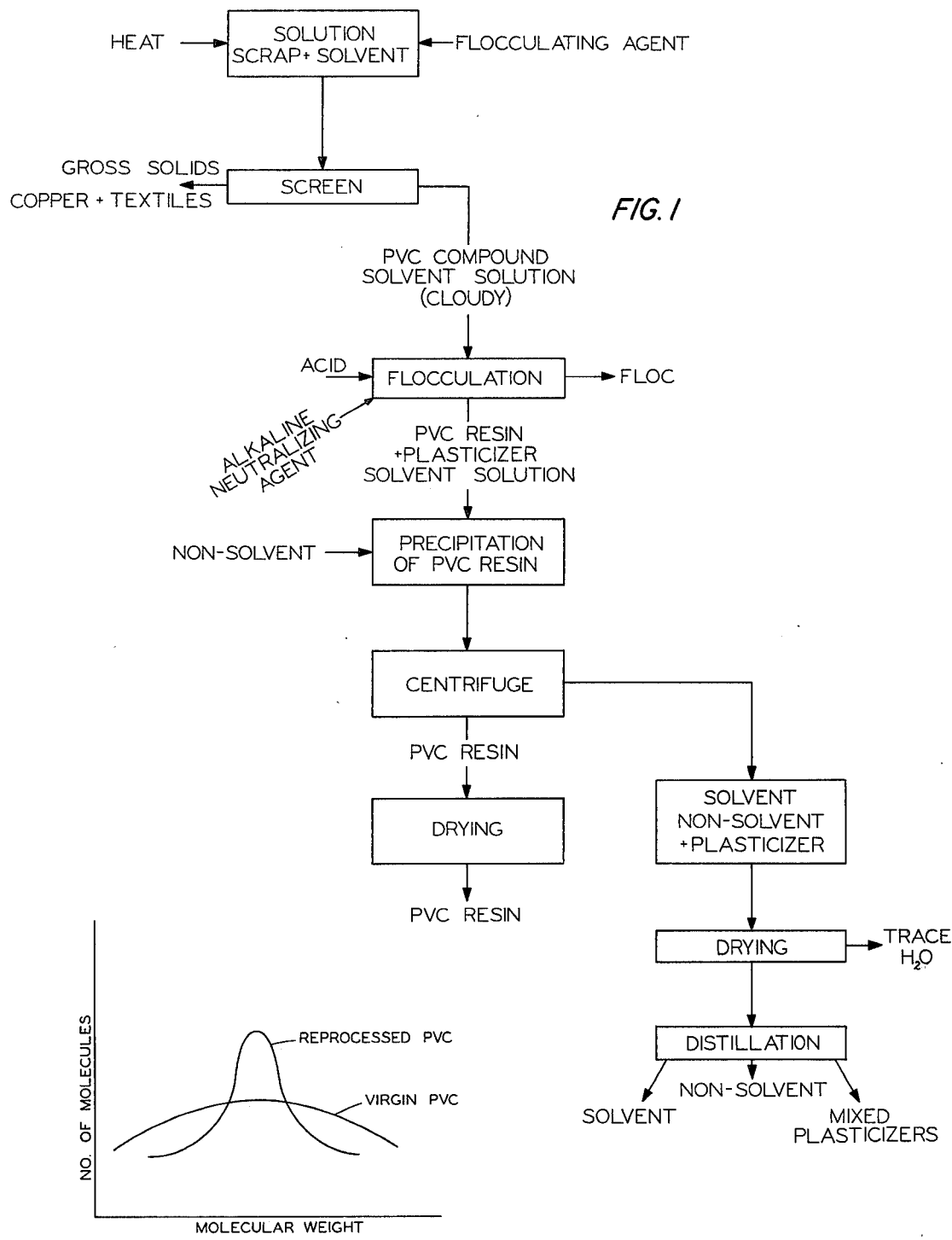
FIG. 1 is a simplified flow diagram depicting and illustrating the steps used in carrying out the principles of the method of this invention.

The present invention is described primarily in terms of steps of a process as illustrated in the flow diagram of FIG. 1 for recovering an essentially pure polyvinyl chloride (PVC) resin and other materials from a scrap charge. The process includes treating the scrap charge which comprises a vinyl chloride polymer composition with a solvent capable of dissolving vinyl chloride polymers such as, for example, methyl-ethyl ketone, hereafter designated as MEK, which has been heated to a suitable temperature, typically approximately 80° C. Upon treatment, a solvent mixture is formed comprising as one component thereof a solvent solution of dissolved vinyl chloride polymer, dissolved plasticizers and suspended particulates.

The solvent mixture is further treated in accordance with the principles of this invention to flocculate the suspended particulates and to treat further the solvent solution to recover an essentially pure PVC resin.

Following the removal of the PVC, there remains a solvent solution which includes the solvent, nonsolvent and plasticizer. The solvent solution is distilled to recover separately the solvent, the nonsolvent and the plasticizers.

The term "vinyl chloride polymer" is intended to include not only homopolymers of vinyl chloride, that is PVC, but also thermoplastic copolymers of vinyl chloride with one or more different monomers.

The terms "vinyl chloride polymer composition" or "PVC compound" are intended to mean one or more of such vinyl chloride polymers with one or more of the additives normally present in vinyl compounds for wire and cable purposes and typically includes, for example, pigments and fillers. The composition may also contain other constituents such as, for example, stabilizers, emulsifiers, plasticizer compositions, waxes, fillers, ultraviolet absorbers and antioxidants.

The term "plasticizer composition" is intended to refer to a composition containing a major proportion of a vinyl chloride polymer plasticizer, alone or in admixture with a minor amount of the vinyl chloride polymer and other ingredients usually present in the manufacture of articles from vinyl chloride polymers such as stabilizers, emulsifiers, but excluding essentially all pigments and fillers.

The term "scrap material" is intended to mean a scrap conductor having an insulation which comprises a vinyl chloride polymer composition, and having a covering which may also include other constituents such as, for example, textiles. The term "scrap material" also is intended to mean a scrap plastic or scrap which is essentially a vinyl chloride polymer composition, such as, for example, that found in extruder purgings.

It should be understood that cross-linked PVC compositions are not dissolved by the process embodying the steps of this invention. Cross-linked compositions are defined as those in which a PVC composition includes a cross-linking agent, e.g., tetraethylene glycol dimethacrylate, TEGDM, which when treated with chemical or electrical radiation causes an interlocking of the molecules.

Figure 2:
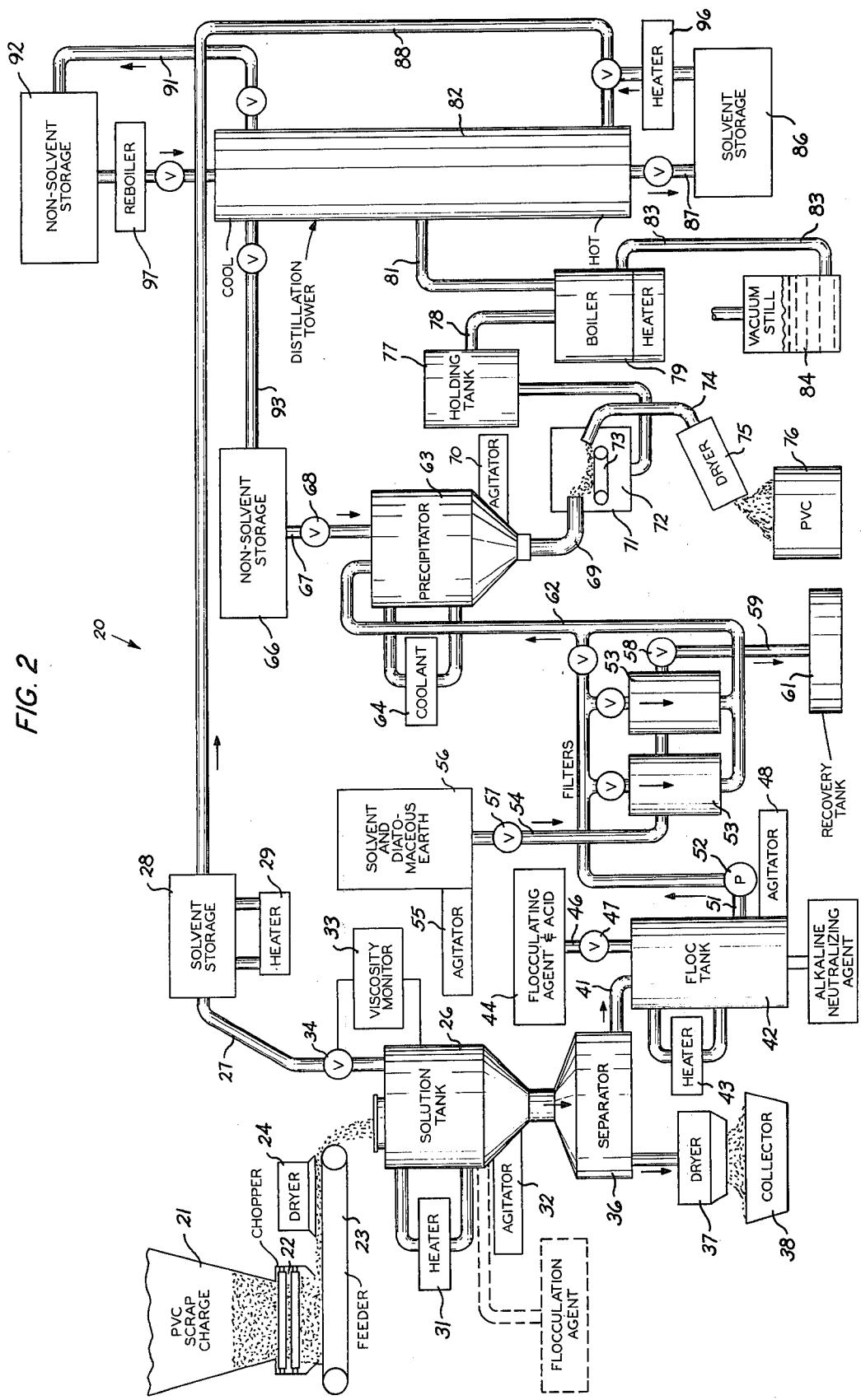
FIG. 2 is a detailed schematic flow diagram showing the sequence of steps as well as apparatus for carrying out the principles of this invention as depicted in FIG. 1.

Referring now to FIG. 2, there is shown an apparatus designated generally by the numeral 20, for carrying out the steps of the flow diagram shown in FIG. 1 for recovering PVC and additives from a scrap vinyl chloride polymer composition.

A charge of scrap material consisting of PVC-compound-insulated conductors, PVC-compound-jacketed cable, or other PVC-containing material is introduced into a hopper 21, and cut by a chopping apparatus 22 into portions which are conveniently about one quarter inch to approximately 6 inches in major dimension. This maximizes the available surface area per unit of scrap thereby promoting rapid dissolution.

It should be understood that while this description involves recovery from a scrap-conductor, scrap material, the principles of this invention are not confined to treating scrap charge which includes copper or other gross solids but are equally applicable to treating a PVC composition of matter such as may be found, for example, in extruder purgings.

Typically, field scrap-conductor, scrap material is comprised of 63% by weight of copper, 7% textile, 18% PVC resin, 7% plasticizer and 5% other additives. The copper content of manufacturing scrap-conductor, scrap material is in the range of 75 to 80% by weight.

The chopped scrap material is discharged onto a feeder, such as a conveyor belt, and thence through a dryer 24 which may be, for example, steam heated to remove moisture. The dried chopped scrap material is then moved into a solution tank 26.

Dissolution of the chopped PVC scrap material occurs in the solution tank 26 where the scrap is contacted by a suitable solvent for vinyl chloride polymers to form a solvent mixture which includes as one component thereof a solvent solution of dissolved vinyl chloride polymer and plasticizers. A suitable solvent includes, for example, MEK, tetrahydrofuran (hereinafter "THF"), dimethyl formamide (hereinafter "DMF"), and cyclohexanone. Preferably, MEK is employed. The solvent is admitted to the solution tank 26 along a line 27 from a storage source 28 where it is advantageously preheated to the boiling point of the solvent, which for MEK is 79°–80° C, by a heater 29.

When MEK is the solvent, the temperature in the tank 26 is preferably maintained by an external heater 31 through steam jacketing, for example, above room temperature and preferably between 70°–80° C. However, when the solvent employed comprises THF or cyclohexanone, the temperature may be maintained at room temperature. Preferably, agitation, provided by an agitator 32, is used to promote the dissolution of the PVC.

At this time, the tank 26 includes the solvent treated scrap material and the resultant solution containing dissolved vinyl chloride polymer. As the PVC and associated plasticizers are dissolved in the MEK, the solution viscosity may be monitored by a controller 33 and MEK is added automatically by action of a feedback loop (not shown) and a valve 34 to insure that the material in the tank 26 does not gel. For efficient use of the solvent, it has been found that the resultant solution should preferably contain at least about three percent by weight of the vinyl chloride polymer.

One of the important aspects of this invention is the capability of removing contaminants such as pigments and fillers, for example, from the solvent mixture to facilitate the recovery of essentially pure PVC that is readily recompoundable for reuse in wire and cable manufacturing processes. In order to accomplish this, a flocculation of the pigments and fillers is caused to occur. It was found unexpectedly that the flocculation is accomplished by contacting the solvent mixture with an acidic consitutent. Further, it was found that except when using cyclohexanone as the solvent, an acid will flocculate out the contaminants only in the presence of a supplementary flocculating agent.

A supplementary flocculating agent is introduced into the tank 26. It was found that for scrap conductor or scrap plastic scrap material solvent mixtures containing up to and including at least 10% by weight of the vinyl chloride polymer, the treatment of the solvent mixture with an acid such as, for example, hydrochloric acid causes a flocculation, of the contaminants. Further, it was found that except when using cyclohexanone as the solvent, the treatment with the acid must be accomplished in the presence of a supplementary flocculating agent such as, cellulose acetate, for example, which is soluble in the solvent solution and which is insolubilized by acid on refluxing. It is believed that the cellulose acetate hydrolizes in the presence of the aqueous acid to yield cellulose, which because of its insolubility in MEK, will fall out of the solution bringing with it the suspended particulates. The acetyl and hydroxl concentration, as well as the chain length of the cellulose acetate are chosen to provide a low viscosity solution to facilitate the precipitation following flocculation.

Also, as disclosed and claimed in application Ser. No. 670,470, now U.S. Pat. No. 4,038,219 filed of even date herewith in the names of V. W. Boehm and B. Broyde and commonly assigned, with respect to both scrap conductor and scrap plastic scrap materials, it was found subsequently that suitable supplementary flocculating agents include polymeric materials such as polystyrene, polymethyl methacrylate, poly (vinyl isobutyl ether), and polyvinyl acetate which are soluble in the PVC solvent and which are insolubilized by the acid on refluxing.

Also, as disclosed in the above-identified application filed of even date herewith, it has been further found that a flocculation of pigment and fillers is caused to occur in scrap conductor, scrap material by the addition of liquid monomeric esters such as, for example, ethyl acetate, propyl acetate, isopropyl acetate, isoamyl acetate, pentyl acetate, butyl acetate, or a mixture of any of the foregoing acetates, as the supplementary flocculating agent prior to the addition of an acid.

Still further, as disclosed in the above-identified application filed of even date herewith it has been found that flocculation of pigments and fillers in a scrap plastic scrap material is caused to occur by the addition of ethylene vinyl acetate as the supplementary flocculating agent prior to the addition of the acid.

It has also been determined that the supplementary flocculation agent must be added to the solvent mixture unless the scrap includes a suitable amount of cellulose acetate, for example 1/10% by weight. Scrap wire containing cellulose acetate may be of the type, for example, disclosed in U.S. Pat. No. 3,668,302, issued June 6, 1972 in the name of D. E. Boland, and incorporated by reference hereinto.

The above described treatment may be required because of the viscosity increasing rapidly with concentration and because the time required to flocculate is a function of viscosity. On the other hand, the more concentrated the solution, the less distillation is required per pound of scrap and hence the better are the economics of the process. The advantages of a higher concentration while avoiding the disadvantage associated therewith may be realized by using THF, but this solvent may be prohibitively expensive.

There are advantages in using one of the herein before-mentioned acetates other than cellulose acetate. Since the acetates enumerated, other than cellulose acetate, are liquids, the acetates may be recycled thus eliminating or at least minimizing the replenishment thereof for the treatment of subsequent batches. However, the use of acetates other than cellulose acetate may complicate the distillation step because of a more complex azeotrope formation.

At this time the solution component of the solvent mixture, comprising solvent and dissolved PVC, is clouded by colloidal material suspended therein. The colloidal material includes pigments, fillers and the like.

These conditions are maintained in the solution tank 26 for a time sufficient to achieve the desired degree of dissolution of the chopped vinyl chloride polymer composition. It has been found that when using MEK as the solvent, each batch or change of scrap material typically should remain in the solution tank for approximately one hour to produce a 5% by weight vinyl chloride polymer solution.

Then the resulting solvent mixture which typically includes a solvent solution and residual undissolved solids, comprising principally metal, but also possibly including other polymeric insulating materials such as polethylene, polypropylene, crosslinked PVC, as well as rubber, synthetic or natural fibers, wood pulp and other relatively bulky insolubles, are passed through a vibrating screen separator 36. Alternatively, the solvent mixture may be admitted to a centrifuge (not shown). At this point, copper, textiles and other insolubles or "gross solids," as they are often designated in the art, are removed from the solvent mixture by screening, passed through a dryer 37, and then deposited in a collector bin 38. These components await conventional sorting and ultimate refining of the copper and other gross solids.

The solvent mixture comprising a solvent solution which includes dissolved PVC, is cloudy and is discharged through a line 41 and into a flocculation tank 42. The flocculation tank 42 is also provided with an agitator 48 and facilities 43 for controlling the temperature of the solvent mixture.

The insoluble particulate material entrained in the solution and admitted to the flocculation tank 42 typically will include a variety of materials used in PVC compounding. These include, but are not limiting to, lead salts such as, for example, a sulfate, carbonate, phosphite or phthalate, fillers such as calcium carbonate and calcined clay, flame retardants such as antimony trioxide, adsorbents such as activated charcoal and any badly degraded or crosslinked PVC which also is insoluble in MEK. These insolubles are removed from the solvent mixture by flocculation procedures pursuant to this invention.

It will be recalled that cellulose acetate, when used as the flocculating agent, is added to the solvent mixture preferably in the tank 26 prior to the removal of gross solids therefrom by centrifuging. It has been determined that the cellulose acetate, which unexpectedly is required in forming a floc of particular constituents of the PVC composition except when using cyclohexanone as the solvent, must be added to the solvent mixture prior to the introduction of an acid in order to minimize the solution time.

Additional cellulose acetate may be added into the tank 42 from a source tank 44 along a line 46 through a valve 47. Optionally, all of the cellulose acetate may be added to the solvent mixture in the tank 42 prior to the introduction of the acid.

The a measured amount of an acid such as nitric acid, sulfuric acid, acetic acid or preferably hydrochloric acid, from the supply 44 is added to the tank 42 in the presence of the cellulose acetate, for example, whereupon the suspended particulates are caused to flocculate and precipitate. Specifically, the cellulose acetate and any clays, fillers, metal salts or insoluble pigments which are present are flocculated out of the solvent mixture. The temperature of the solvent mixture is increased by the heater 43 to within generally the range of 65° C to reflux, e.g., 82° C, depending on atmospheric pressure, and is accompanied by agitation. The solution is allowed to remain warm for approximately 15 to 30 minutes and agitated slowly for about 10 minutes to allow flocculation to occur. In a preferred embodiment, the solvent mixture in the tank 42 may be heated to reflux prior to the introduction of the acid.

It is speculated that the acid, e.g., hydrochloric acid, initiates the flocculation by rendering insoluble the cellulose acetate and that coagulation of the particulate additives in the PVC scrap solutions prepared in THF, MEK, DMF or cyclohexanone then occurs.

The hydrochloric acid, which is added to the solvent mixture, causes the flocculation of essentially all pigments, fillers and the like which are included in the scrap charge. The floc advantageously is removed from the solvent mixture to leave behind a solvent solution comprising a vinyl chloride polymer, a solvent and a plasticizer.

It will be observed that the cellulose acetate has been flocculated out of the solvent mixture. In order to recover finally an essentially pure resin, the plasticizer and the solvent and non-solvents for reuse, it becomes necessary to remove the acid used to cause the flocculation. This may be accomplished by adding a constituent such as, for example, calcium hydroxide, having a basic pH value, to neutralize the acid. The calcium hydroxide is added to the solvent mixture several minutes, e.g. on the order of ten minutes after the addition of the acid and heating of the contents of the tank 42. Unexpectedly, the basic material, e.g., calcium hydroxide, has a dual function. Not only does it advantageously neutralize the acidic constituent, but it also accelerates the flocculation process by about 75%.

Suprisingly, the calcium carbonate which may be present as a filler apprently does not neutralize the acid constituent prematurely. Since only a small amount of acid is used as compared to the calcium carbonate present, it would appear to be expected that the calcium carbonate would neutralize the acid before the flocculation would begin to occur.

The solvent mixture is then moved along a line 51 by a pump 52 and into filters 53-53. It is well known in the art to filter a solvent mixture to remove colloids. The principles of this invention which include flocculation render filtration unnecessary. However, filtration is a worthwhile supplement to the flocculation to still further refine the solvent mixture. Moreover, filtration may be used to removed effectively large curds from the solvent mixture. It should be understood that other techniques such as centrifuging or settling could be used instead of the filtering.

The filters 53-53 are supplied along a line 54 from a supply tank 56 through a valve 57. The supply tank 56 includes a filter medium such as a suspension of diatomaceous earth in MEK solution which is stirred by an agitator 55 and is moved into the filters 53-53 and deposited as a coating.

Typically, each filter element includes a support such as a perforated metal base plate and a fine-mesh metal or fabirc material on top thereof. Atop the mesh, a coating of particulate filter material such as diatomaceous earth is built up, advantageously to a thickness of about a 16th of an inch, or 1.0 to 1.5 pounds of diatomaceous earth for every 10 square feet of filter surface.

The filters 53-53 remove the floc. In a preferred embodiment, the floc is settled out in the tank 42 with the solvent mixture decanted out the top. The removal of the floc at the bottom of the tank 42 saves advantageously the filters 53-53.

The use of the heater 43 facilitates high filter flow rates by maintaining the solvent mixtures at a temperature, for example, in the range of 30° C to 65° C, at which the viscosity does not become too great. Likewise, the filters 53-53, when used, may be heated by facilities (not shown).

The filter system is rechargeable when the diatomaceous earth is particle-saturated. This is accomplished by shutting off the tank 42 at the valve 52 and by flushing the system with solvent through the charging line 54. Spent diatomaceous earth, residual solvent and other filtered constituents are removed from the filters 53-53, moved through a valve 58, alone a line 59 and into a recovery tank 61.

Following the flocculation and the optional filtering or centrifuging step, the next step of the process which embodies the principles of this invention includes treating the solvent mixture to precipitate out the PVC. The solvent mixture is moved along a line 62 at room temperature into a precipitator 63 having cooling facilities 64 in a preferred embodiment. An essentially pure uncontaminated PVC, is precipitated out of the solvent mixture, advantageously as powdery granules, by adding a substantially equal volume of a suitable non-solvent, or precipitating agent for the vinyl chloride polymer, which may be, for example, methyl alcohol (methanol) or a methanol-MEK azeotrope.

The non-solvent is moved from a storage tank 66 along a line 67 and through a valve 68 into the precipitator 63. The non-solvent and the solvent mixture now in the tank 63 are subjected to a stirring action by an agitator 70. The temperature of the solvent solution in the precipitator is cooled advantageously to approximately 25° C by suitable cooling apparatus such as, for example, the cooling facilities 64 shown in FIG. 2. Cooling at this stage renders the PVC less soluble in the solvent, e.g., MEK and hence more readily precipitable. The solvent, e.g., MEK and the non-solvent, e.g., methanol are miscible in substantially all proportions, and as noted, the non-solvent, e.g., methyl alcohol also dissolves advantageously the plasticizer.

Care also must be used to select a precipitating agent or non-solvent which precipitates out as high a percentage as possible of the dissolved PVC present. Methyl alcohol (methanol) or an MEK-methanol azeotrope has been found to be an effective non-solvent for the PVC. When added so that that the methanol content is in a 50:50 ratio by volume to the solvent, e.g., MEK, solution, better than 99% of the PVC present is precipitated. A 40:60 methyl alcohol-MEK mixture precipitates 97-98% of the PVC, which is an acceptable, although somewhat less efficient, recovery factor. It has been found that methanol in excess of the 50:50 ratio does not yield significantly more PVC. When using a recycled azeotrope of MEK-methanol system, it has been found that 2.7 parts of azeotrope to one part MEK are required to precipitate efficiently the PVC.

The precipitator contents are discharged through a line 69 into a separator 71 where the PVC precipitate may be moved onto a vacuum filter bed 72. Advantageously, the bed 72 includes a moving wire mesh belt 73 which transports the particles across the vacuum bed where the solvent and precipitating agents are removed. The particles are fed to a chute 74 which leads into a resin dryer 75. The residual solvent and the precipitating agents are here removed, and dried. Granular, substantially pure, PVC is collected in a bin 76 and is ready to be reused in insulating and sheathing material for wire and cable.

It was mentioned earlier that the acid used in the flocculating step may be removed by the addition of a neutralizing agent subsequent to the addition of the acid itself to the solvent mixture. In the alternative, the solvent solution which includes the PVC solvent and non-solvent, the plasticizers and the acid may at this time in the process be passed over a neutralizing bed, e.g., a calcium hydroxide bed.

The solvent solution is collected in a holding tank 77 which supplies the solution along a line 78 to a boiler 79. In the boiler 79, the elevated temperature causes the solvent and non-solvent to be boiled off along the line 81 to a fractional distillation tower 82. The remaining plasticizers are pulled over a line 83 to a vacuum still 84 where the plasticizers may be recovered individually.

In telephone wire and cable products, the plasticizers typically are dialkyl phthalates in which the alkyl groups contain between 6 and 13 carbon atoms. Another class of plasticizers commonly used are adipates which are made from adipic acid and alcohol. The adipates will also dissolve in the non-solvents described above. The phthalates and adipates are generally high boiling point viscous oils boiling at about 200° C and above.

Of the phthalate plasticizers, the common ones are di-2-ethylhexyl phthalate (DOP), boiling point at 5 milimeters, 185° C; diisooctyl phthalate (DIOP), boiling point at 5 millimeters, 195° C; diisodecyl phthalate (DIDP), boiling point at 5 millimeters, 248° C; ditridecyl phthalate (DTDP), boiling point at 5 millimeters, 300° C; n-hexyl-n-decyl phthalate (610P), boiling point at 247° C; and n-octyl-n-decyl phthalate (810P), boiling point 261° C. Another common plasticizer family are phosphates such as tricresyl phosphate, boiling at about 410° C. All of the aforementioned plasticizers may be recovered by the principles of the methods of this invention.

In the fractional distillation tower 82, the solvents and non-solvents are separated according to their respective boiling points. For example, in the situations where MEK and methanol are employed as the solvent and non-solvent, respectively, MEK and an azeotrope of methanol and MEK, as opposed to pure methanol, are recovered and reusable as the solvent and non-solvent. The higher boiling point MEK, condenses in the lower region of the fractional distillation tower 82 and is either removed to an auxiliary storage tank 86 via a line 87 or returned over a line 88 to the MEK storage tank 28. The MEK-methanol azeotrope, having a lower boiling point, is removed at the upper region of the tower 82 and is either moved through a line 91 and collected in an auxiliary tank 92 or is returned via line 93 to the storage tank 66. The MEK in the auxiliary storage tank 86 is reheated in a heater 96 before reuse.

It will be recalled that acetates other than cellulose acetates may be used as a flocculating agent. If so, the other acetates known to be suitable for this purpose are liquid acetates and may be directed along the line 88 together with the solvent to the storage tank 28. This avoids the necessity of substantial replenishment of the flocculating agent.

In general, plasticized or unplasticized scrap vinyl chloride polymers capable of being dissolved may be solvent-reclaimed by the process of the present invention. The PVC suitable for reclaiming by the practice of this invention includes at least all general purpose resins embraced within the industry specification ASTM D1755-60T.

The recovered PVC resin advantageously has been found to have a significantly more peaked molecular weight distribution curve than that of virgin PVC's. The distribution curve for virgin and PVC recucled by a process embodying the principles of this invention are shown in FIG. 3. The molecular weight distribution may effect the processing qualities of resins. A high molecular weight increases processing difficulties whereas low molecular weight resins may have less than desired chemical or physical properties. A resin having a molecular weight distribution of the recovered resin has less than normal high weight distribution and therefore is easier to process, and has fewer low weight molecules thereby yielding improved physical properties.

The apparatus 20 which embodies the principles of this invention includes facilities for conserving solvent. Condensing equipment which receives solvent and precipitant vapors developed at numerous stages in the process and condenses them for reuse is not shown in FIG. 2 for sake of clarity. However, it is to be understood that condensing apparatus may be associated with the solution tank 26, the screen 36, the precipitator 63, and the vacuum filter 73, as well as at other locations in the system where solvent or other vapors accumulate.

It has been determined that a number of binary systems comprising solvents and precipitating agents may be used commercially in recovering polyvinyl chloride. The principal difference between the many binary systems which could be employed involves the volumes of the precipitating agent required to yield a thoroughly dried resin of high porosity. Dissolved PVC resin can be precipitated from the solution comprising any solvent provided the non-solvent for the PVC is of sufficiently different polarity and as long as it is completely miscible in the solvent.

The binary system should be designed so that the solvent which is a volatile organic liquid has a boiling point sufficiently different from that of the non-solvent to permit the economical separation and recovery of the solvent and the non-solvent by the fractional distillation thereof.

It has been found that THF and cyclohexanone are most suitable solvents for PVC and that they solvate virgin PVC resin readily and at room temperature (25° C). No heat is required to affect a homogeneous solution of low viscosity. Although THF appears to be preferred, it is costly.

The MEK requires mild heating to approximately 40° C to solvate PVC resin. Once in solution, however, cooling to moderate temperatures of approximately 20° C does not cause precipitation. High PVC concentrations promote gel formation when agitation is not continuous. The use of MEK as the solvent yields a high quality resin without solvent occlusion. Cyclohexanone, as well as MEK, is especially suitable for commercial recovery processes because of its low cost. Once solvated in cyclohexanone, it has been found that the PVC does not precipitate nor cause gelling on reduction of temperature nor does the solution become especially viscous. With this solvent, the polarity of the precipitating agent is more important than with THF or MEK.

One difficulty encountered with cyclohexanone concerns the drying of the PVC resin after precipitation. Cyclohexanone tends to plasticize the PVC resin, yielding a soft material unless large volumes of precipitant (30 per part of cyclohexanone, for example) are used. This problem can be circumvented by washing the freshly precipitated resin with pure precipitant. This removes the cyclohexanone from the resin and permits thorough drying to yield desirably a powdery, dry PVC resin.

Although not required, it has been found that a mild heating of DMF is advantageous in dissolving the PVC resin. Alcoholic precipitants cause substantial occlusion of DMF and incomplete drying of precipitated resin (110 percent recovery). It has been found that washing the wet precipitated resin with fresh precipitant effectively removes residual DMF and permits complete drying thereby yielding dry resin in porous form as opposed to the rigid material recovered after the regular precipitation sequence.

Mesityl oxide has been investigated to determine its dissolution effect upon PVC and irradiated PVC. As with the other hereinbefore mentioned four solvents, mesityl oxide dissolves PVC but not the irradiated PVC. The PVC resin is recoverable as a moderately hard precipitant with the addition of methanol.

In general, the precipitating agent non-solvent should be selected so as to dissolve all the plasticizers that may be encountered in the scrap recovery process. Substantially, all alcohols will precipitate PVC from any PVC solvent. The preferred alcohols, however, are those which have the characteristics of low boiling point, low cost and low toxicity. Precipitating agents that are either highly polar or highly nonpolar are candidates for the process.

An alternative system for reclaiming PVC is to employ THF as a solvent and isopropyl alcohol as the precipitant. The boiling point of THF is 65° C and that of isopropyl alcohol is 80° C, thus providing a favorable separation for fractional distillation.

The following examples are illustrative of reclamation processing in accordance with the principles of this invention. All parts and percentages are by weight unless otherwise indicated.

EXAMPLE I

Six hundred seventy-four grams of cyclohexanone solvent were heated to 69° C and were used to treat a 100.9 gram charge of PVC insulated scrap wire (e.g. 20–26 guage) and PVC jacket cable comprising mixed alkyl phthalate plasticizer that had been chopped into approximately one-fourth inch lengths. The PVC was dissolved in the solvent and 69.6 grams of coarse gross solids were filtered out. The resultant filtrate was heated to 151° C accompanied by agitation. At that point, 1.1 ml of concentrated HCl was added to flocculate suspended particulates. After two minutes, 2.25 grams of calcium hydroxide were added. The application of heat and agitation was discontinued to allow the floc to settle. The clear supernatant liquid was decanted from the 10.7 grams of floc. Two thousand ml of methanol were added to precipitate out the PVC. The PVC was filtered off through filter paper and was washed in 1000 ml methanol. The PVC was then dried in a vacuum oven for several hours, yielding 16 grams of essentially pure resin. The filtrate was collected and evaporated to yield 5.1 grams of mixed alkyl phthalate plasticizer.

EXAMPLE II

A charge of 34.9 grams of PVC wire and cable scrap which had been chopped into approximately one-fourth inch lengths was mixed with 235 grams of MEK. Approximately 0.4 gram of cellulose acetate was added. The mixture was refluxed until the PVC had dissolved and then filtered to remove the gross solids such as metal and other insoluble components of scrap. The resulting opaque colloidal liquid suspension was heated to reflux with agitation and 0.5 ml of conc. HCl was added. This was followed within one minute by the addition of 0.6 gram of calcium hydroxide. A large curd floc formed. The application of heat was discontinued and the floc settled. The clear supernatant liquid comprised mainly of PVC, MEK and plasticizer was decanted. Added to the decanted solution to cause precipitation of the PVC were 810 ml of the MEK-methanol azeotrope. The PVC was filtered out on filter paper and dried for several hours in a vacuum oven to yield 6.5 grams of an essentially pure resin. The filtrate, comprised mainly of MEK, methanol and plasticizer was subjected to heat and air to boil off the MEK and methanol yielding 2.1 grams of mixed alkyl phthalate plasticizer.

EXAMPLE III

A charge of 34.9 grams of PVC wire and cable scrap which had been chopped into approximately one-fourth inch lengths was mixed with 257 grams of MEK and approximately 0.5 gram of cellulose acetate was added thereto. The mixture was refluxed with the application of heat and agitation until the PVC had dissolved. The mixture of undissolved solids, colloidally suspended material, and solution of PVC, plasticizers and cellulose acetate was filtered to remove the coarse undissolved solids. The supernatant fluid was heated to boiling and 0.5 ml of HCl was added which resulted in immediate flocculation of the suspended particles. The application of heat and agitation was discontinued to allow the floc to settle and the clear supernatant, comprised mainly of PVC, plasticizers and MEK, was decanted from the floc. The PVC was precipitated out of solution by the addition of 450 ml methanol. Both the PVC solution and the methanol were at room temperature. The particulate PVC was filtered out and dried in a vacuum oven to yield 6.5 grams of resin. The supernatant was evaporated off to yield 2.1 grams of mixed alkyl phthalate plasticizers.

EXAMPLE IV

A charge of scrap PVC wire and cable was mixed with MEK and cellulose acetate and treated essentially as in Example III. The only difference was that in the flocculation step, gaseous hydrogen chloride was bubbled into the PVC compound — MEK filtrate. This caused immediate flocculation.

EXAMPLE V

A charge of 34.0 grams of scrap PVC wire and cable chopped into one-fourth inch lengths was added to 230 grams MEK. The PVC was dissolved and the coarse solids were removed as in the preceding example. The cloudly fluid from the coarse filtration was heated to boiling and 0.5 ml conc. HCl was added followed by the addition of 0.6 gram of calcium hydroxide. Coarse floc formed immediately. The mixture was immediately removed from the heat to allow the floc to settle. The clear liquid was decanted and 450 ml methanol were used to precipitate the PVC resin. The resin was dried and 6.1 grams were collected; 2 grams of the mixed alkyl phthalate plasticizer recovered.

EXAMPLE VI

A charge of 40.0 grams of scrap PVC wire and cable was added to 266 grams of THF with 0.5 gram cellulose acetate. The PVC dissolved in about 30 minutes. At this point the coarse, undissolved components were filtered out. The remaining opaque liquid was heated to reflux and 0.5 ml conc. HCl was added. The n 0.6 gram calcium hydroxide was added causing the immediate formation of a large curd floc. The mixture was allowed to cool and settle for 75 minutes. The clear solution was decanted and 450 ml of isopropanol were added. The volume of solution was reduced by evaporation and the PVC resin precipitated out. The PVC that was filtered out was dried to yield 7.4 grams. Then the solvent and non-solvent were boiled off from the filtrate yielding 2.5 grams of mixed alkyl phthalate plasticizer.

TEST RESULTS

A PVC resin recovered in accordance with the principles of the methods of this invention together with 27 parts of recovered mixed plasticizers, per 100 parts resin, were compounded with 5 parts of diphenyl phthalate, per 100 parts of resin, 0.4 parts of wax, per 100 parts of resin, 0.4 parts of dibasic lead stearate, per 100 parts resin, and 7 parts of dibasic lead phthalate, per 100 parts resin, to yield an extrudable material suitable for an insulating compound. The properties of the compound are:

TABLE I

| | |
|---|---|
| Specific Gravity | 1.3 – 1.4 |
| Tensile Strength | > 3500 |
| Ultimate Elongation | > 250% |
| Thermal Stability | > 10 minutes |
| Tear Resistance | > 1000 #/in. |
| Shear Resistance | > 2000 |
| Volume Resistivity Wet | > $10^{16}$ |
| Dry | > $10^{16}$ |
| Dielectric Constant | 3.7 – 3.8 |

EXAMPLE VII

Same as Example III except that poly (vinyl isobutyl ether) was used in place of cellulose acetate.

EXAMPLE VIII

Same as Example III except that poly (methyl methacrylate) was used in place of cellulose acetate.

EXAMPLE IX

Same as Example III except that polystyrene was used in place of cellulose acetate.

EXAMPLE X

Same as Example III except that poly (vinyl acetate) was used in place of cellulose acetate.

EXAMPLE XI

Same as Example III except that ethyl acetate was used in place of cellulose acetate.

EXAMPLE XII 20 grams of PVC extruder purgings and 0.5 gram of ethylene vinyl acetate were dissolved in 400 grams of methyl ethyl ketone by refluxing the well stirred mixture for 1 hour. Then 4 ml of concentrated hydrochloric acid were added to the solution and the reflux continued for another 20 minutes. As the solution cooled 4 grams of flocculated material settled out and were removed.

500 ml of methanol were added and 11 grams of resin precipitated. The solution was evaporated and 3 grams of mixed alkyl phthalates were recovered.

EXAMPLE XIII 100 grams of chopped scrap cable and wire were stirred with 400 grams of MEK and 20 grams of ethyl acetate. The solution was stirred and refluxed for 1 hour and then 4 ml of concentrated hydrochloric acid were added. Reflux was continued for another 20 minutes. The same procedure was followed as was given in Example I.

EXAMPLE XIV

Same as Example XIII except that isopropyl acetate was used instead of ethyl acetate.

EXAMPLE XV

Same as Example XIII except that butyl acetate was used instead of ethyl acetate.

EXAMPLE XVI

Same as Example XIII except that isoamyl acetate was used instead of ethyl acetate.

It is to be understood that the above described arrangements are simply illustrative of this invention. Other arrangements may be devised by those skilled in the art which will embody the principles of the invention and fall within the spirit and scope thereof.

What is claimed is:

1. A process for recovering a reusable essentially pure vinyl chloride polymer resin from a polymer mixture which comprises plasticized polyvinyl chloride and insoluble particulate additives, which includes the steps of:
    contacting a polymer mixture which comprises plasticized polyvinyl chloride and insoluble particulate additives with a solvent for vinyl chloride polymers to form a solvent mixture comprising a solvent solution of dissolved vinyl chloride polymer and plasticizers and insoluble particulate additives in suspension;
    treating the solvent mixture with at least an acid which is selected from the group consisting of an inorganic acid and an inorganic acid solution and which is substantially soluble in the solvent to flocculate and remove the suspended particulate additives; and
    treating the solvent solution with a non-solvent which is miscible with the solvent in substantially all proportions and which is a solvent for the plasticizer to precipitate an essentially pure vinyl chloride polymer resin therefrom.

2. The process of claim 1, which also includes the step of contacting the solvent mixture with calcium hydroxide subsequent to the treatment with the acid.

3. The process of claim 1, wherein the polymer mixture is a scrap conductor material and the solvent is a solvent selected from the group consisting of methyl ethyl ketone, tetrahydrofuran, and dimethyl formamide, and the step of treating the solvent mixture to flocculate and remove the suspended particulates includes treating the solvent mixture with the acid in the presence of a flocculating agent which is soluble in the solvent solution and insolubilized by acid on refluxing.

4. The process of claim 1 wherein the polymer mixture is a scrap plastic scrap material, the solvent is selected from the group consisting of methyl ethyl ketone, tetrahydrofuran, and dimethyl formamide and the step of treating the solvent mixture to flocculate and remove the suspended particulates includes the addition of a flocculating agent to the solvent mixture prior to the addition of the acid and the flocculating agent is a cellulose acetate.

5. The process of claim 1, wherein the acid is an acid selected from the group consisting of nitric acid, sulfuric acid, and hydrochloric acid.

6. The process of claim 1, wherein the solvent is selected from the group consisting of tetrahydrofuran, methyl ethyl ketone, cyclohexanone, or dimethyl formamide.

7. The process of claim 1, wherein the non-solvent is selected from the group consisting of methanol, isopropanol, n-butanol, or an azeotrope of methyl ethyl ketone and methanol.

8. The process of claim 1, which subsequent to the step of contacting the polymer mixture with the solvent includes the step of removing gross solids from the solvent mixture.

9. The process of claim 1, wherein the non-solvent for the vinyl chloride polymer produces fine-grained unagglomerated vinyl chloride particles, the non-solvent being miscible in all proportions with the solvent for the vinyl chloride, the non-solvent for the vinyl chloride being a solvent for the plasticizer in the plasticized polyvinyl chloride and having a boiling point significantly different from both the plasticizer and the solvent for the vinyl chloride polymer.

10. The process of claim 1, wherein the weight percent vinyl chloride resin dissolved in the solvent is at least one-half percent.

11. The method of claim 1, wherein the plasticized vinyl chloride polymer includes substantially a single plasticizing constituent, and the plasticizer recovery step comprises removing the plasticizer remaining behind after distilling the solution comprising the solvent, non-solvent and plasticizers.

12. The process pursuant to claim 1, wherein the plasticized vinyl chloride polymer includes more than one plasticizing constituent each with different boiling points, and the plasticizing constituents are separated from one another by fractional distillation.

13. A method of separating metal, polyvinyl chloride and plasticizer from scrap conductor scrap material and plasticized polyvinyl chloride which also includes insoluble particulate matter comprising pigments and fillers, comprising the steps of:
    dissolving the polyvinyl chloride in methyl ethyl ketone at a temperature above ambient to form a solvent mixture containing a solvent solution comprising dissolved polyvinyl chloride, entrained particulate material and undissolved conductor metal;
    separating the undissolved metal from the solvent mixture;
    treating the solvent mixture with an acid which is selected from the group consisting of an inorganic acid and an inorganic acid solution and which is substantially soluble in the solvent in the presence of a cellulose acetate flocculating agent which is soluble in the solvent solution and is insolubilized by an acid on reflux to cause a flocculation of the pigments and fillers;
    treating the solvent solution to precipitate out the polyvinyl chloride by adding methanol in which the polyvinyl chloride is substantially insoluble and which produces fine-grained unagglomerated polyvinyl chloride particles, the methanol being miscible in all proportions with the methyl ethyl ketone, being a solvent for the plasticizer in the resin material, and having itself a boiling point significantly different from both the methyl ethyl ketone and the plasticizer;

removing the polyvinyl chloride; and fractionating the remaining solvent solution to recover separately the solvent, an azeotrope of the methanol and methyl ethyl ketone and the plasticizer.

14. A method of separating fillers, metal salts, and insoluble pigments from a vinyl chloride polymer scrap material, which includes:

contacting a vinyl chloride polymer scrap material with a solvent which is a solvent for vinyl chloride polymer and plasticizers to form a solvent mixture; and contacting the solvent mixture with at least an acid which is selected from the group consisting of an inorganic acid and an inorganic acid solution and which is substantially soluble in the solvent to flocculate the fillers, metal salts and insoluble pigments.

15. The method of claim 14, wherein the acid is selected from the group consisting of nitric acid, sulfric acid, and hydrochloric acid.

16. The method of claim 14, which also includes the step of adding calcium hydroxide subsequent to the addition of the acid.

17. The method of claim 14, wherein the solvent includes methyl ethyl ketone, tetrahydrofuran and dimethyl formamide and the method further includes the addition of cellulose acetate prior to the addition of the acid.

18. The method of claim 14, wherein the solvent is selected from the group consisting of tetrahydrofuran, methyl ethyl ketone, cyclohexanone or dimethyl formamide and the scrap material is a scrap conductor scrap material.

19. The method of claim 14, wherein the solvent is cyclohexanone and the scrap material is a scrap plastic scrap material.

20. A method of recovering an essentially pure plasticized polyvinyl chloride resin from a polyvinyl chloride scrap material, which includes the step of:

contacting a polyvinyl chloride scrap material with a solvent which is a solvent for a vinyl chloride polymer and plasticizers to form a solvent mixture;

flocculating out insoluble additives by treating the solvent mixture with at least an acid which is selected from the group consisting of an inorganic acid and an inorganic acid solution and which is substantially soluble in the solvent; and evaporating the solvent to recover an essentially pure plasticized polyvinyl chloride.

21. The method of claim 20, wherein the acid is selected from the group consisting of nitric acid, sulfuric acid, and hydrochloric acid.

22. The method of claim 20, which also includes the addition of calcium hydroxide after the addition of the acid.

23. The method of claim 20 wherein the solvent includes methyl ethyl ketone, tetrahydrofuran or dimethyl formamide and the method also includes the addition of a flocculating agent which is soluble in the solvent solution and which is insolubilized by an acid or reflux.

24. The method of claim 20, wherein the solvent is selected from the group consisting of tetrahydrofuran, methyl ethyl ketone, cyclohexanone or dimethyl formamide.

25. An essentially pure polyvinyl chloride resin recovered from a scrap plastic charge in accordance with the method of claim 1.

26. An essentially pure plasticized polyvinyl chloride resin recovered from a scrap plastic charge in accordance with the method of claim 14.

* * * * *